US006226069B1

(12) United States Patent
Tabuchi et al.

(10) Patent No.: US 6,226,069 B1
(45) Date of Patent: May 1, 2001

(54) STACKLESS CONTINUOUS DUAL-SIDED COPYING METHOD IN PHOTOCOPIERS

(75) Inventors: Hidehiro Tabuchi; Yasuhiko Kida; Katsuji Furushige, all of Osaka (JP)

(73) Assignee: Mita Industrial Co., Ltd., Osaka (JP)

( * ) Notice: Subject to any disclaimer, the term of this patent is extended or adjusted under 35 U.S.C. 154(b) by 0 days.

(21) Appl. No.: 09/448,414

(22) Filed: Nov. 23, 1999

(30) Foreign Application Priority Data

Dec. 2, 1998 (JP) ..................................... 10-342515
Dec. 2, 1998 (JP) ..................................... 10-342516
Dec. 2, 1998 (JP) ..................................... 10-342517

(51) Int. Cl.[7] .......................... G03B 27/32; G03B 15/00
(52) U.S. Cl. .............................. 355/26; 355/77; 399/364
(58) Field of Search ................................ 355/407, 408, 355/23–27, 40, 77; 399/16–18, 361, 364, 367–370; 271/3.01–3.05, 264

(56) References Cited

U.S. PATENT DOCUMENTS 5,057,874 * 10/1991 Miyazaki et al. .................... 355/316
5,315,360 * 5/1994 Yamauchi et al. ................... 355/319
5,537,196 * 7/1996 Matsumoto et al. ................. 355/320
5,781,825 * 7/1998 Okamoto ................................ 399/17

* cited by examiner

*Primary Examiner*—Alan A. Mathews
*Assistant Examiner*—Hung Henry Nguyen
(74) *Attorney, Agent, or Firm*—Shinjyu Intellectual Property Firm

(57) ABSTRACT

The invention provides a stackless continuous dual-sided copying method in photocopying machines. The method includes: a first step of finding as a circulatable sheet count the number of copy sheets that can stay in a circulating conveyance path when performing stackless continuous dual-sided copying; a second step of successively feeding sheets of copy paper wherein the number of the fed sheets is based on the circulatable sheet count if a copy sheet count remaining amount is greater than the circulatable sheet count, and successively convey-introducing the sheets of copy paper into the circulating conveyance path from a copy-sheet conveyance entry point for the circulating conveyance path; and a third step of resuming sheet-feeding operations at a predetermined timing after the last sheet of the copy sheets has finished passing the conveyance entry point in the circulating conveyance path, for starting a next continuous dual-sided copying cycle after copying to first sides of the copy sheets successively convey-introduced into the circulating conveyance path in the second step is completed. Accordingly, when carrying out stackless continuous dual-sided copying in accordance with the present invention, there is no need for copy sheet detection sensors to determine whether the number of copy sheets conveyed to the circulating conveyance path has reached the conveyable sheet count.

7 Claims, 5 Drawing Sheets

Fig. 3

| COPY SIZE / SHEET SUPPLY LEVEL | A3 | B4 | A4R | A4 | B5R | B5 | A5R |
|---|---|---|---|---|---|---|---|
| MANUAL BYPASS | 20 | 21 | 22 | 25 | 27 | 32 | 25 |
| 1ST LEVEL | 26 | 29 | 36 | 51 | 41 | 51 | 51 |
| 2ND LEVEL | 26 | 29 | 36 | 51 | 41 | 51 | 51 |
| 3RD LEVEL | 24 | 27 | 34 | 47 | 38 | 47 | 47 |
| 4TH LEVEL | 24 | 27 | 34 | 47 | 38 | 47 | 47 |

Fig. 4

| COPY MODE \ COPY SIZE | | A3 | B4 | A4R | A4 | B5R | B5 | A5R |
|---|---|---|---|---|---|---|---|---|
| NO AGGREGATION | NO IMAGE ROTATION | 29 | 33 | 40 | 51 | 46 | 51 | 51 |
| | 90° IMAGE ROTATION | — | — | 29 | 35 | 38 | 51 | 35 |
| | 180° IMAGE ROTATION | 16 | 20 | 35 | 44 | 42 | 51 | 44 |
| 2 - IN - 1 AGGREGATION | NO IMAGE ROTATION | 20 | 24 | 31 | 38 | 37 | 46 | 38 |
| | 90° IMAGE ROTATION | — | — | 22 | 27 | 28 | 34 | 27 |
| | 180° IMAGE ROTATION | 15 | 20 | 26 | 31 | 32 | 38 | 31 |
| 4 - IN - 1 AGGREGATION | NO IMAGE ROTATION | 18 | 23 | 29 | 37 | 27 | 44 | 37 |
| | 90° IMAGE ROTATION | — | — | 22 | 25 | 28 | 31 | 25 |
| | 180° IMAGE ROTATION | 15 | 19 | 25 | 30 | 35 | 37 | 30 |

STACKLESS CONTINUOUS DUAL-SIDED COPYING METHOD IN PHOTOCOPIERS

BACKGROUND OF THE INVENTION

1. Technical Field

The present invention relates to a stackless continuous dual-sided copying method for photocopying machines.

2. Description of Related Art

Among photocopying machines, some are equipped with a continuous dual-sided copying function wherein dual-sided copying is carried out in a circulating conveyance path without stacking the copy sheets following one-sided copying (hereinafter referred to as a stack-less continuous dual-sided copying function). When carrying out continuous dual-sided copying in such photocopiers, copy sheets are fed successively, and reverse-side copying is performed successively on the fed copy sheets. A predetermined position on the circulating conveyance path (hereinafter called the circulatable sheet-count discriminating position) is for discriminating that the number of copy sheets being conveyed has reached a maximum value. The count of copy sheets that can stay in the circulating conveyance path defines this maximum value (hereinafter called the circulatable sheet count). When the sheet on which reverse-side copying was performed first reaches the circulatable sheet-count discriminating position, the copier discriminates that the count of copy sheets in conveyance is the circulatable sheet count, and halts fresh copy-sheet supply.

Thereafter, front-side copying is carried out successively on the copy sheets on which reverse-side copies were made. Then, once the front-side copying operation is performed for the last copy sheet currently being conveyed on the circulating conveyance path, sheet feeding is restarted and the same operations are repeated.

The circulatable sheet count differs according to, for example, copy size, copy mode and sheet-feed level, and therefore the circulatable sheet-count discriminating position also varies according to the copy size, copy mode and sheet-feed level. Therefore, copy-sheet detection sensors are disposed in a plurality of circulatable sheet-count discriminating positions determined beforehand in the circulatable conveyance path. The copy-sheet detection sensors are disposed at circulatable sheet-count discriminating positions determined based upon, in the present instance for example, copy size, copy mode and sheet-feed level. Based on the output from the copy-sheet detection sensors, whether or not the copy sheet on which reverse-side copying was first performed has reached the circulatable sheet-count discriminating position is discriminated.

A problem conventionally has been that discriminating whether the sheet count of copy paper being conveyed on the circulating conveyance path has reached the circulatable sheet count has necessitated utilizing a plurality of copy sheet detection sensors.

Conventionally too, when sheet feeding is resumed, shifting to the next continuous dual-sided copying cycle, copy sheets are fed from a sheet-feeding cassette and conveyed into the circulating conveyance path. The sheet-feeding cassettes are at multiple levels from the copy-sheet conveyance entry position. When sheet-feeding from a cassette that is in a location remote from the conveyance entry position, proceeding from resumption of the sheet-feeding operation to the point at which a copy sheet is conveyed to the registration roller pair takes time. This is a problem in that it lengthens the time it takes for continuous dual-sided copying operations.

SUMMARY OF THE INVENTION

An object of the present invention is to make copy sheet detection sensors used to determine whether or not the number of copy sheets being conveyed along the circulating conveyance path has reached a circulatable sheet count unnecessary by a stackless continuous dual-sided copying method in photocopying machines.

Another object of the present invention is to make possible avoiding what would be overlapping at the copy-sheet conveyance entry point in the circulating conveyance path of the copy sheet that was fed first and on which reverse-side copying was carried out, and a copy sheet fed later. This might occur when in the midst of sequentially feeding a circulatable sheet count quantity of copy paper a non-feed jam arises, in a continuous dual-sided copying cycle for a circulatable sheet count quantity of copy paper.

Yet another object of the present invention by a stackless continuous dual-sided copying method in photocopying machines, aims for curtailed processing time for continuous dual-sided copying.

By one aspect of the present invention, a stackless continuous dual-sided copying method in photocopying machines is characterized in including: a first step that finds as a circulatable sheet count the number of copy sheets that can stay in a circulating conveyance path when carrying out stackless continuous dual-sided copying; a second step that successively feeds only the circulatable sheet count quantity of copy sheets if the copy sheet count remaining amount is greater than the circulatable sheet count, the circulatable sheet count quantity of copy sheets being successively convey-introduced into the circulating conveyance path from a copy-sheet conveyance entry point for the circulating conveyance path; and a third step that resumes sheet-feeding operations for starting the next continuous dual-sided copying cycle upon completion of copying to first sides of the copy sheets successively convey-introduced into the circulating conveyance path in step 2, at a predetermined timing after the last sheet of the copy sheets has completed passing the aforementioned conveyance entry point in the circulating conveyance path.

This invention enables a stackless continuous dual-sided copying method in photocopying machines that does not require the use of a plurality of copy sheet detection sensors to discriminate whether the number of copy sheets conveyed onto the circulating conveyance path has reached the circulatable sheet count.

In accordance with the present invention the stackless continuous dual-sided copying method in photocopying machines may also include a fourth step of halting sheet-feeding operations so that sheet-feeding retry operations will not be carried out when a non-feed jam has arisen in the second step, and a fifth step of resuming sheet-feeding operations at a predetermined timing after the last sheet of the copy sheets has finished passing said conveyance entry point in the circulating conveyance path, for starting a next continuous dual-sided copying cycle after image transfer to first sides of the copy sheets convey-introduced into said circulating conveyance path is completed, until in said fourth step the sheet-feeding operations are halted. There may be times when a non-feed jam has arisen in the midst of successively carrying out sheet feeding of a circulatable sheet count quantity in a continuous dual-sided copying cycle for the circulatable sheet count quantity of copy paper. This invention, however, makes possible avoiding what would be overlapping at the copy-sheet conveyance entry point in the circulating conveyance path of the copy sheet that was fed first and on which reverse-side copying was carried out, and a copy sheet fed later.

The first step can also include, for example, computing copy speed based on copy size, copy mode, and position of a sheet-feeding section from which copy sheets are fed; and a step for determining the circulatable sheet count based on the computed copy speed. "Copy speed" herein means the copy sheet count per unit time, but copy-processing time per single copy sheet may be used for copy speed.

By another aspect of the present invention, in photocopying machines wherein during stackless continuous dual-sided copying, copy sheets are successively fed and conveyed into a copying circulation conveyance path and conveyance of fresh copy sheets into the copying circulation conveyance path is prohibited from a timing point when a forward end of a leading copy sheet conveyed into the copying circulation conveyance path reaches a first pre-established position, to when a trailing end of a final copy sheet conveyed at the timing point into the circulation conveyance path passes a second pre-established position; a method for stackless continuous dual-sided copying is characterized in: carrying out sheet-feeding operations and operations for conveyance into the copying circulation conveyance path for one further copy sheet even after the timing point when the forward end of the leading copy sheet conveyed into the copying circulation conveyance path has reached the pre-established first position; halting the sheet-feeding operations and the operations for conveyance into the copying circulation conveyance path when the leading end of said further fed copy sheet reaches a position before a copy-sheet conveyance entry point for the copying circulation conveyance path; and resuming the sheet-feeding operations and the operations for conveyance into the copying circulation conveyance path for starting a next continuous dual-sided copying cycle after the trailing end of the final copy sheet conveyed into the circulation conveyance path has passed the second pre-established position. The present invention, is designed so as to curtail processing time for continuous dual-sided copying.

The foregoing and other objects, features, aspects and advantages of the present invention will become more apparent from the following detailed description in conjunction with the accompanying drawings.

BRIEF DESCRIPTION OF THE DRAWINGS

FIG. 3 is a graph typifying a first copy speed table wherein relations of copy speed to sheet feed level/copy size combinations are stored;

FIG. 4 is a graph typifying a first copy speed table wherein relations of copy speed to copy size/copy mode combinations are stored.

DETAILED DESCRIPTION OF THE PREFERRED EMBODIMENTS

The following is a description, with references to the drawings, of a first embodiment of the present invention.

Figure 1:
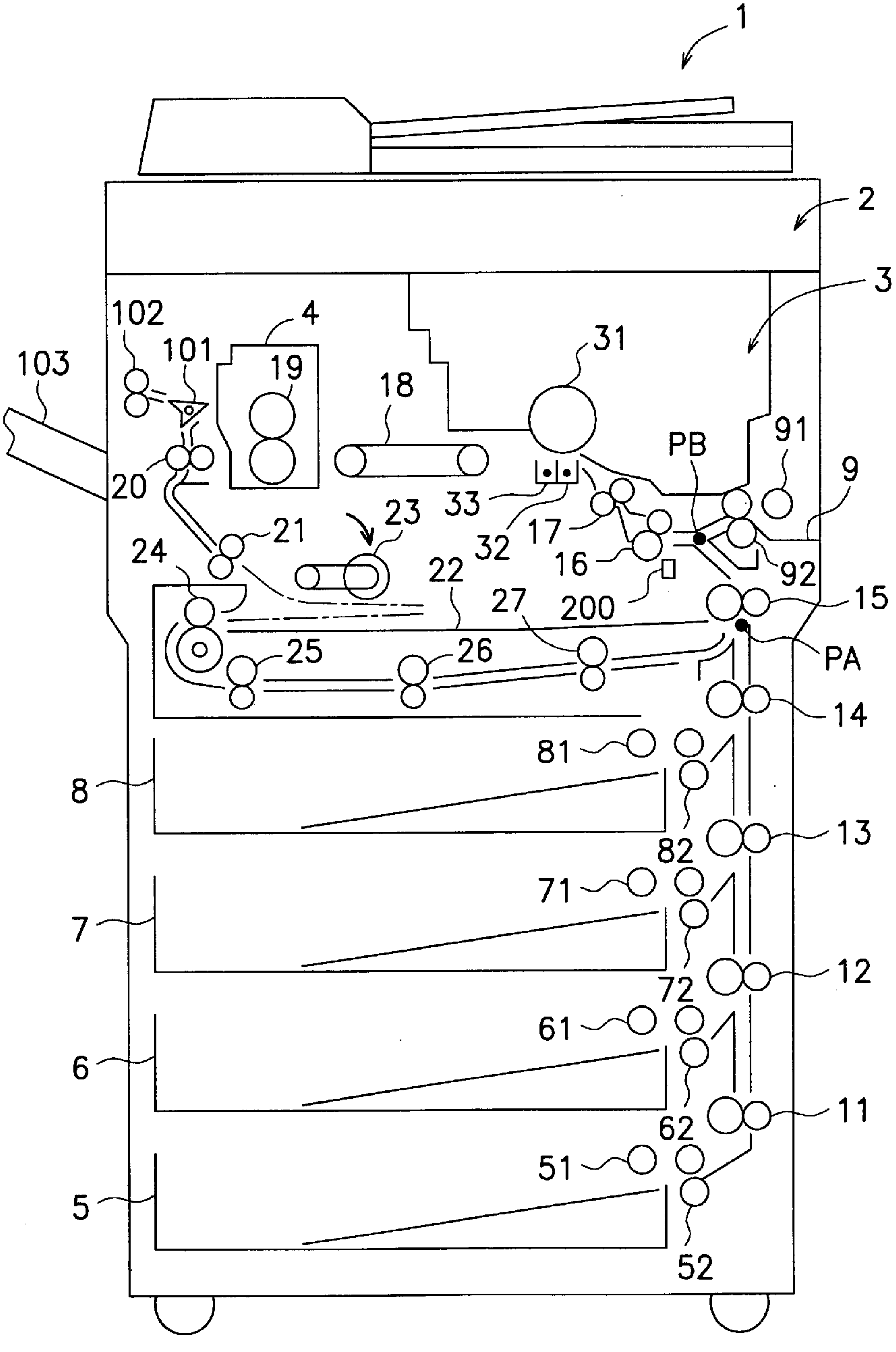
FIG. 1 is an elevational view schematically illustrating the gross configuration of a digital photocopier in a first embodiment of the present invention.

FIG. 1 shows the overall structure of a digital copier.

As is well known, a digital copier includes: a document feeding section 1, a scanner 2, an imaging section 3, a fixing unit 4, sheet-feeding cassettes 5, 6, 7, 3, a manual feed tray 9, and sheet conveying mechanisms.

The document feeding section 1 comprises an automatic document feeder (ADF). The scanner 2 includes an illumination lamp, an optical system, a CCD, a laser unit (components not shown in the figure). The imaging section 3 principally includes a photosensitive drum 31, a charging device (omitted from fig.), a developing device (omitted from fig.), a transfer discharge device 32, a separating discharge device 93, a cleaning device (omitted from fig.), and an anti-static device (omitted from fig.).

Now describing the sheet conveying mechanism, sheet-feeding rollers 51, 61, 71, 81 and 91 for feeding copy sheets are provided for the sheet-feeding cassettes 5, 6, 7, 8 and the manual feed tray 9, respectively. Separating roller pairs 52, 62, 72, 82 and 92 for preventing fed copy sheets from overlapping as they are sent, are likewise provided for the sheet-feeding cassettes 5, 6, 7, 8 and the manual feed tray 9.

A copy sheet fed from the sheet-feeding cassette 5 at the lowermost level (the fourth level) is sent to a registration roller pair 17 via first through sixth feed roller pairs 11–16. A copy sheet fed from the sheet-feeding cassette 6 at the third level is sent to the registration roller pair 17 via the second through the sixth feed roller pairs 12–16. A copy sheet fed from the sheet-feeding cassette 7 at the second level is sent to the registration roller pair 17 via the third through the sixth feed roller pairs 13–16. A copy sheet fed from the sheet-feeding cassette 8 at the uppermost level (the first level) is sent to the registration roller pair 17 via the fourth through the sixth feed roller pairs 14–16. A copy sheet fed from the manual feed tray 9 is sent to the registration roller pair 17 via the sixth feed roller pair 16.

A copy sheet sent to the registration roller pair 17 is then sent by the registration roller pair 17 to the transfer position located near the photosensitive drum 31, where a toner image formed on the photosensitive drum 31 is transferred to the copy sheet. Then, the copy sheet is peeled off the photosensitive drum 31. The copy sheet peeled off the photosensitive drum 31 is sent by a conveyor belt 18 to a fixing roller pair 19 in the fixing unit 4, where the toner image transferred to the copy sheet is fixed to the copy sheet.

In continuous dual-sided copying mode, a copy sheet on which an image has been transferred to a first side (i.e., a copy sheet on which reverse-side copying has been performed) passes through the fixing roller pair 19 and then is sent toward a seventh feed roller pair 20 by a separating claw 101. The seventh feed roller pair 20 and an eighth feed roller pair 21 then send the copy sheet to a direction switcher 22. The copy sheet sent to the direction switcher 22 is sent by an advancing roller 23 toward a ninth feed roller pair, and is sent to a fifth feed roller pair 15 by ninth through twelfth feed roller pairs 24, 25, 26, 27.

A plurality of jam detection sensors, not shown in the figure, is disposed in the circulating conveyance path between the tenth feed roller pair 25 and the twelfth feed roller pair 27. However, in the present invention, these sensors do not have to be used for determining circulatable sheet count. Accordingly, the control programs can be simplified.

The copy sheet is sent by the fifth and the sixth feed roller pairs 15, 16 and the registration roller pair 17 to the transfer position near the photosensitive drum 31, and an image is transferred to the succeeding side. The copy sheet on which an image has been transferred to the succeeding side (i.e., the copy sheet on which front-side copying has been performed) passes through the fixing roller pair 19 and is then sent toward a discharge roller pair 102 by the separating claw 101. The discharge roller pair 102 ejects the copy sheet onto an exit tray 103.

The copy sheet is conveyed along a path by the fifth and the sixth feed roller pairs 15, 16, the registration roller pair 17, the conveyor belt 18, the fixing roller pair 19, the seventh feed roller pair 20, the eighth feed roller pair 21, the direction switcher 22, the advancing roller 23, and the ninth through the twelfth feed roller pairs 24, 25, 26, 27. In this specification, this path is referred to as a circulating conveyance path.

Also, the copy-sheet conveyance entry point in the circulating conveyance path refers to the point at which the fed copy sheet is conveyed into the circulating conveyance path. If a copy sheet is fed from the sheet-feeding cassettes 5, 6, 7, or 8, the copy-sheet conveyance entry point is point PA in FIG. 1. If a copy sheet is fed from the manual feed tray 9, the copy-sheet conveyance entry point is point PB in FIG. 1.

When the copy start button is pressed while the digital copier is in the continuous dual-sided copying mode, the copier computes the copy sheet count per minute (hereinafter referred to as the copy speed) before beginning copying operations. The copy speed is computed based on the copy size, the copy mode, and the tray position (sheet-feeding level) from which the copy sheet is to be fed. The computed copy speed is used to determine the copy sheet count that can stay in the circulating conveyance path (hereinafter referred to as the circulatable sheet count).

Then, if the designated copy count (the preset count) is greater than the circulatable sheet count, the following operations are carried out. Copy sheets are fed successively from the paper-feeding cassette (or from the manual feed tray), with the number of copy sheets being the circulatable sheet count. The copy sheets are successively conveyed from the copy-sheet conveyance entry point into the circulating conveyance path. Once the number of copy sheets conveyed into the circulating conveyance path reaches the circulatable sheet count, i.e., once the final copy sheet of the circulatable sheet count has been conveyed into the circulating conveyance path, sheet-feeding operations are halted.

The timing at which sheet-feeding operations are to be halted can be determined, for example, as follows. A copy sheet detection sensor 200 is disposed between the fifth feed roller pair 15 and the sixth feed roller pair 16 and downstream along the copy sheet conveyance direction from the point PB. Then, based on a detection signal from the copy sheet detection sensor 200, a counter indicating copy sheets conveyed into the circulating conveyance path is incremented. When the count value in the counter reaches the circulatable sheet count, sheet-feeding operations are halted.

Once the number of copy sheets determined by the circulatable sheet count has been conveyed in, copying and fixing for the first side of all the copy sheets (reverse-side copying) have been completed. The final sheet of these copy sheets has then passed the copy-sheet conveyance entry point of the circulating conveyance path, and at a predetermined timing, the sheet-feeding operation is resumed to start the next continuous dual-sided copy cycle. At this point, if the remaining copy count (the number of copies left to be done) is greater than the circulatable sheet count, the operations described above are carried out.

The timing at which to resume sheet-feeding operations can be determined, for example, as follows. When the sheet-feeding operation is halted, the count value in the foregoing counter is equal to the circulatable sheet count. Once the sheet-feeding operation is halted, the count value is decremented by one each time the trailing end of a copy sheet (in this case, a copy sheet on which reverse-side copying has been performed) is detected by the copy sheet detection sensor 200. Then, when the value of the counter reaches zero, the sheet-feeding operation is resumed.

If a paper-feed failure or a non-feed jam takes place during the feeding of the circulatable sheet count quantity of copy sheets, the sheet-feeding operation is attempted again (sheet-feeding retry operation) after a predetermined time interval has elapsed. If this sort of sheet-feeding retry operation arises, there is a decrease in copy speed (copy sheet count per unit time) in the continuous dual-sided copy cycle for the circulating sheet count of copy sheets.

Consequently, it is possible that, during the continuous dual-sided copy cycle for the circulatable sheet count of copy sheets, the number of copy sheets indicated by the circulatable sheet count that was initially computed will not be able to stay in the circulating conveyance path. This could lead to the copy sheet that was fed first and on which reverse-side copying has been performed, and a copy sheet that is fed later overlapping with each other at the copy-sheet conveyance entry point of the circulating conveyance path during the dual-sided copy cycle for the circulatable sheet count of paper. This can result in a paper jam.

If, during a continuous dual-sided copy cycle, a non-feed jam takes place, the sheet-feeding operation is halted so that the sheet-feeding retry operation will not be carried out. Then, once the copying for the first side (reverse-side copying) for the copy sheets that have been fed up to that point has been completed, sheet-feeding operations are resumed at a predetermined timing after the timing point when the final sheet has passed the copy-sheet conveyance entry point of the copy sheet conveyance path.

The timing at which sheet-feeding operations are resumed after a non-feed jam has arisen and halted sheet-feeding operations can be determined, for example, as follows. If a non-feed jam takes place during the dual-sided copy cycle, the count value in the foregoing counter will be equal to the number of copy sheets that had been fed up to the point at which the non-feed jam arose. After the non-feed jam has arisen, the value of the counter described above is decremented by one each time the copy sheet detection sensor 200 detects the trailing end of a copy sheet (in this case, copy sheets on which reverse-side copying has been performed). The sheet-feeding operation is resumed when the counter count value reaches zero.

Figure 2:
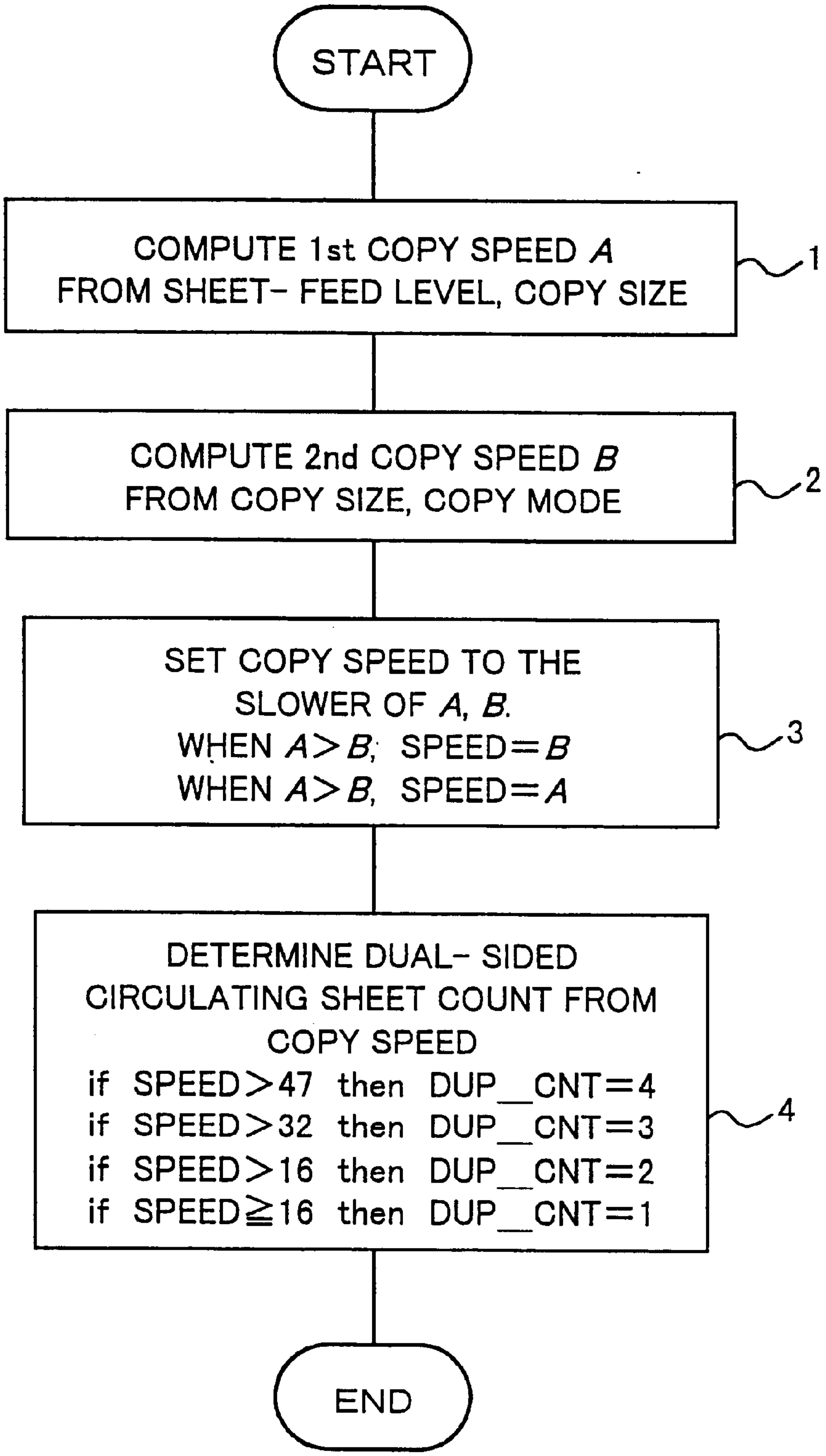
FIG. 2 is a flowchart illustrating an example of a circulatable sheet-count computing method.

Referring to FIG. 2, there is shown an example of a method for calculating the circulatable sheet count.

First, a first copy speed A is found based on sheet-feed level and copy size (step 1). As shown in FIG. 3, copy speeds for paper-feed level and copy-size combinations are determined beforehand and stored in a storage device as a first copy speed table. Then, from among the copy speeds in the first copy speed table, the copy speed corresponding to the combination of the user-designated copy size and the position of the tray from which copy sheets are fed (sheet feed level) is sought as the first copy speed A.

Next, a second copy speed B is determined based on the copy size and the copy mode (step 2). As shown in FIG. 4, copy speeds for copy-size and copy-mode combinations are determined beforehand and stored in the storage device as a second copy speed table. Then, from among the copy speeds in the second copy speed table, the copy speed corresponding to the combination of the user-designated copy size and the copy mode is sought as the second copy speed B.

In FIG. 4, "2-in-1 aggregation" refers to a mode in which two documents are copied onto a single copy sheet, and "4-in-1 aggregation" refers to a mode in which four documents are copied onto a single copy sheet.

Next, a copy speed SPEED is assigned as the slower of the first copy speed A and the second copy speed B (step 3).

A circulatable sheet count DUP_CNT is determined based on the determined copy speed SPEED and a plurality of threshold values (step 4). More specifically, the circulatable sheet count DUP_CNT is determined according to the following equation 1.

Equation 1

If SPEED>47, then DUP_CNT=4;

if SPEED>32, then DUP_CNT=3;

if SPEED>16, then DUP_CNT=2;

if SPEED 16, then DUP_CNT=1.

Second Embodiment

Figure 5:
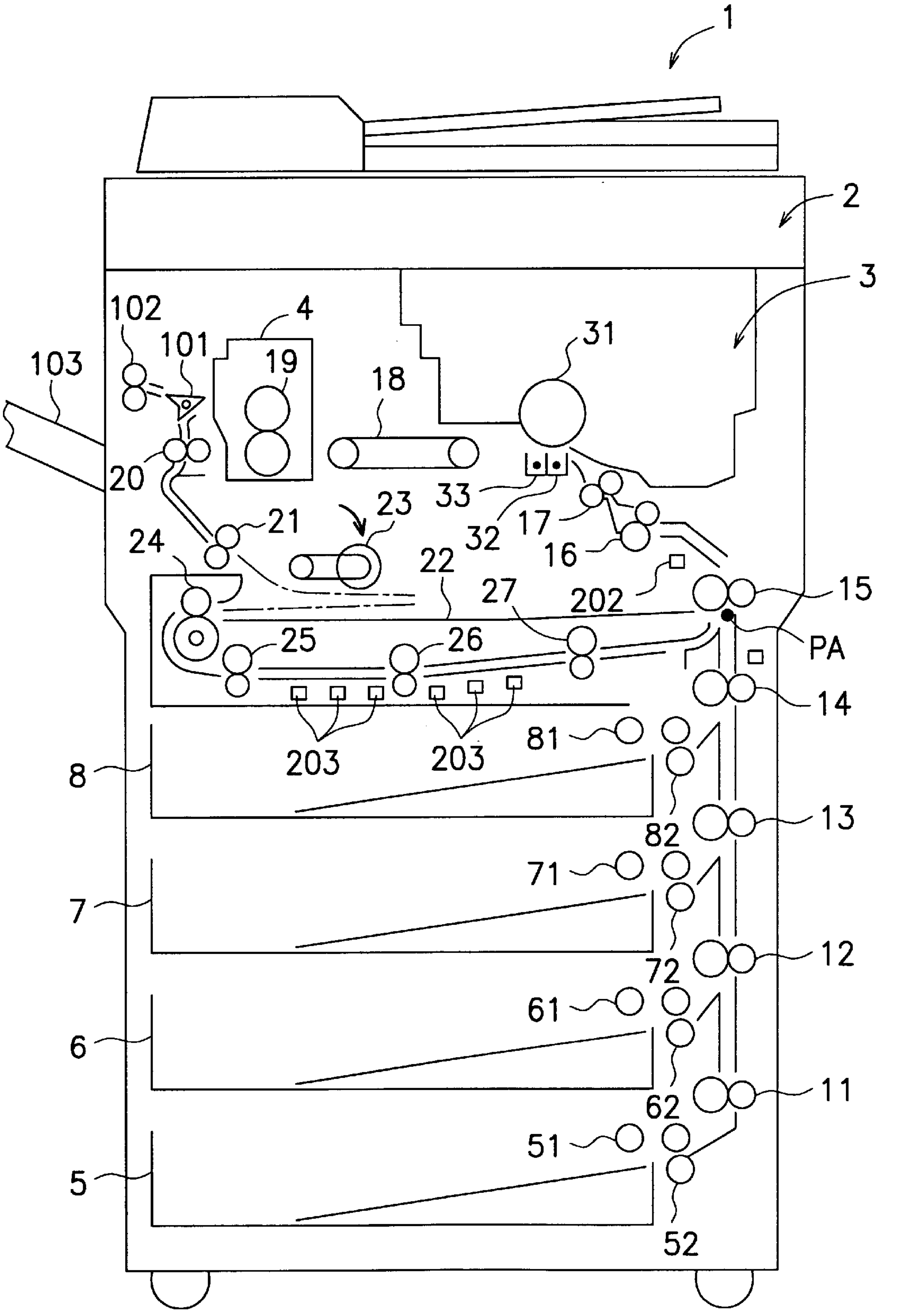
FIG. 5 is an elevational view corresponding to FIG. 1, schematically illustrating the gross configuration of a digital photocopier in a second embodiment of the present invention.

FIG. 5 shows the overall structure of a digital copier according to a second embodiment of the present invention. The basic structure of this digital copier is similar to that of the digital copier described for the first embodiment. Thus, descriptions of structures that are the same as in the first embodiment will be omitted.

The copy-sheet conveyance entry point in the circulating conveyance path refers to a position PA, where a fed copy sheet is conveyed into the circulating conveyance path.

A first copy sheet detection sensor 201, which serves to keep a copy sheet in a standby state, is disposed between the fourth feed roller pair 14 and the fifth feed roller pair 15. A second copy sheet detection sensor 202 is disposed along the circulating conveyance path between the fifth feed roller pair 15 and the sixth feed roller pair 16. Furthermore, third copy sheet detection sensors 203 are disposed at a plurality of predetermined circulatable sheet-count discriminating positions along the circulating conveyance path between the tenth feed roller pair 25 and the twelfth feed roller pair 27.

When this digital copier is in continuous double-sided copying mode, the circulatable sheet-count discriminating positions are determined when copying is started based on copy size, copy mode and sheet feed levels, and then the corresponding third copy sheet detection sensors 203 are specified.

Then, copy sheets are successively fed from a sheet-feeding cassette and are successively conveyed into the circulating conveyance path from the copy-sheet conveyance entry point PA in the conveyance path. Each time a copy sheet conveyed into the circulating conveyance path is detected by the second copy sheet detection sensor 202, a counter is incremented.

When the pre-designated third copy sheet detection sensor 203 then detects the forward end of the leading copy sheet conveyed into the circulating conveyance path, paper-feeding operations and operations for conveying paper into the circulating conveyance path are halted. (The paper-feeding operations are by the sheet-feeding roller and the separating roller pair, and the operations for paper conveyance into the circulating conveyance path are by the first through the fourth feed roller pairs 11–14.) This occurs at a timing point when the first copy sheet detection sensor 201 initially detects the leading end of the copy sheet fed from the feed cassette after the point in time when the pre-designated sensor 203 has detected the leading copy sheet forward end.

Consequently, once the forward end of the leading copy sheet conveyed into the circulating conveyance path is detected by the pre-designated sensor 203, the first copy sheet subsequently fed from the sheet-feeding cassette is stopped in a position where its leading end has reached the copy sheet detection sensor 201. This position is, in other words, just before the copy-sheet conveyance entry point PA in the circulating conveyance path.

Sheet-feeding and conveying-in operations are then resumed so that the next continuous copying cycle can be started. The operations are resumed at a prescribed timing after image transfer and fixing for the first sides of all the copy sheets (reverse-side copying) conveyed into the circulating conveyance path is completed, and the final sheet of these has passed the copy-sheet conveyance entry point in the circulating conveyance path. Control operations like those described above are then carried out.

The timing at which the sheet-feeding and conveyance entry operations are resumed can be determined, for example, as follows. When the leading end of the first of the copy sheets conveyed into the circulating conveyance path is detected by the pre-selected third copy sheet detection sensor 203, the count value in the foregoing counter will be the same as the number of copy sheets conveyed into the circulating conveyance path up to that point in time.

Once the leading end of the first of the copy sheets conveyed into the circulating conveyance path has been detected by the pre-selected third copy sheet detection sensor 203, the counter's count value is decremented by one each time the trailing end of a copy sheet (in this case a copy sheet on which reverse-side copying has been performed) is detected by the second copy sheet detection sensor 202. Then, when the value of the counter described above reaches zero, paper feeding and conveying-in are resumed.

Various details of the present invention may be changed without departing from its spirit nor its scope. Furthermore, the foregoing description of the embodiments according to the present invention is provided for illustration only, and not for the purpose of limiting the invention as defined by the appended claims and their equivalents.

What is claimed is:

1. In photocopying machines, a stackless continuous dual-sided copying method including:

a first step of finding as a circulatable sheet count a number of copy sheets that can stay in a circulating conveyance path when carrying out stackless continuous dual-sided copying;

a second step of successively feeding only the circulatable sheet count of copy sheets if a copy sheet count remaining amount is greater than the circulatable sheet count, the circulatable sheet count of copy sheets being successively convey-introduced into the circulating conveyance path from a copy-sheet conveyance entry point for the circulating conveyance path; and a third step of resuming sheet-feeding operations at a predetermined timing after the last sheet of the copy sheets has finished passing said conveyance entry point in the circulating conveyance path, for starting a next continuous dual-sided copying cycle after copying to first sides of the copy sheets successively convey-introduced into the circulating conveyance path in said step 2 is completed.

2. A stackless continuous dual-sided copying method as set forth in claim 1, wherein the first step includes:

computing a copy speed based on copy size, copy mode, and position of a sheet-feeding section from which copy sheets are fed; and finding the circulatable sheet count based on the computed copy speed.

3. A stackless continuous dual-sided copying method as set forth in claim 2 wherein the copy speed is copy sheet count per unit time.

4. A stackless continuous dual-sided copying method as set forth in claim 1 further including:

a fourth step of halting sheet-feeding operations so that sheet-feeding retry operations will not be carried out when a non-feed jam has arisen in the second step; and a fifth step of resuming sheet-feeding operations at a predetermined timing after the last sheet of the copy sheets has finished passing said conveyance entry point in the circulating conveyance path, for starting a next continuous dual-sided copying cycle after image transfer to first sides of the copy sheets convey-introduced into the circulating conveyance path is completed, until in said fourth step the sheet-feeding operations are halted.

5. A stackless continuous dual-sided copying method as set forth in claim 4, wherein the first step includes:

computing a copy speed based on copy size, copy mode, and position of a sheet-feeding section from which copy sheets are fed; and finding the circulatable sheet count based on the computed copy speed.

6. A method for stackless continuous dual-sided copying for copiers as described in claim 5 wherein the copy speed is copy sheet count per unit time.

7. A method for stackless continuous dual-sided copying in a photocopying machine wherein during stackless continuous dual-sided copying, copy sheets are successively fed and conveyed into a copying circulation conveyance path and conveyance of fresh copy sheets into the copying circulation conveyance path is prohibited from a timing point when a forward end of a leading copy sheet conveyed into the copying circulation conveyance path reaches a first pre-established position, to when a trailing end of a final copy sheet conveyed at the timing point into the circulation conveyance path passes a second pre-established position; the method for stackless continuous dual-sided copying characterized in:

carrying out sheet-feeding operations and operations for conveyance into the copying circulation conveyance path for one further copy sheet even after the timing point when the forward end of the leading copy sheet conveyed into the copying circulation conveyance path has reached the pre-established first position;

halting the sheet-feeding operations and the operations for conveyance into the copying circulation conveyance path when the leading end of the further fed copy sheet reaches a position before a copy-sheet conveyance entry point for the copying circulation conveyance path; and resuming the sheet-feeding operations and the operations for conveyance into the copying circulation conveyance path for starting a next continuous dual-sided copying cycle after the trailing end of the final copy sheet conveyed into the circulation conveyance path has passed the second pre-established position.

* * * * *